US007207701B2

(12) United States Patent
Kennedy et al.

(10) Patent No.: US 7,207,701 B2
(45) Date of Patent: Apr. 24, 2007

(54) SELF-POWERED ILLUMINATION DEVICE

(75) Inventors: Miles Kennedy, Dunrobin (CA); John Charles Tutton, North Gower (CA); Aldo Balatti, Greely (CA); Marcus Willi Karl Gerhard Bosch, Ottawa (CA)

(73) Assignee: Ultra-Light Floating Objects Inc., Kanata, Ontario (CA)

( * ) Notice: Subject to any disclaimer, the term of this patent is extended or adjusted under 35 U.S.C. 154(b) by 48 days.

(21) Appl. No.: 10/980,255

(22) Filed: Nov. 4, 2004

(65) Prior Publication Data

US 2006/0092630 A1 May 4, 2006

(51) Int. Cl.
*B60Q 1/00* (2006.01)
*F21V 1/00* (2006.01)

(52) U.S. Cl. ........................................ 362/477; 441/16

(58) Field of Classification Search ................ 362/477; 441/13, 16–18

See application file for complete search history.

(56) References Cited

U.S. PATENT DOCUMENTS

| | | | | | |
|---|---|---|---|---|---|
| 2,109,813 | A | * | 3/1938 | Winckler | 441/18 |
| 2,201,094 | A | * | 5/1940 | Kassel | 362/343 |
| 3,253,138 | A | * | 5/1966 | Nagel | 362/268 |
| 5,351,432 | A | * | 10/1994 | Tse | 43/17.5 |
| 5,961,204 | A | * | 10/1999 | Martich et al. | 362/295 |
| 6,203,170 | B1 | * | 3/2001 | Patrick et al. | 362/234 |
| 6,848,807 | B2 | * | 2/2005 | Guerrieri | 362/155 |
| 6,900,735 | B2 | * | 5/2005 | Guerrieri et al. | 340/815.4 |

* cited by examiner

*Primary Examiner*—Jason Moon Han
(74) *Attorney, Agent, or Firm*—David J. French

(57) ABSTRACT

A self-powered illumination device includes an illumination source protruding from its lower surface for projecting light into a body of water to provide light that is emitted preferentially outwardly to illuminate the sides of a pool. Light emitted with an upward angle of inclination strikes the underside surface of the water-air interface surrounding the device and is reflected outwardly and laterally away the from the light source after striking such underside surface. Preferably, the illumination source has a length that extends downwardly that is commensurate or greater than its width and may be in the form of a fluorescent tube. The illumination device is fully self righting when inverted on the surface of a body of water.

18 Claims, 8 Drawing Sheets

SELF-POWERED ILLUMINATION DEVICE

FIELD OF THE INVENTION

This invention relates to a self-powered light source which, in its preferred embodiment, is adapted for floating on the surface of a body of water. Additionally, this light source, when combined with other components, has an extended number of applications.

BACKGROUND OF THE INVENTION

Existing systems for illuminating pools often rely on pool-wall mounted lights. Almost invariably such lights are at least partially recessed or, at most, are flush with a wall surface upon which they are mounted. The consequence is that, even when a floodlight is employed, the illumination is virtually exclusively directed to surfaces facing the light, with very little light being directed to lateral wall surfaces. Further, being mounted on the side of the pool, illumination is developed which is not symmetrical about the central area of the pool.

An advantage of a floating light source is that it may be placed more centrally within the pool than a wall-mounted light source. This possibility enables illumination in all radial directions within a pool from a single source. However, if the light from such a floating source is directed downwardly, then illumination of the wall surfaces of the pool near the surface of water will be minimal, arising for the most part from light reflected off lower surfaces within the pool.

It is known to provide illumination devices which will float on the surface of a body of water and project light down into the water below. One example is that depicted in U.S. Pat. No. 3,748,457. In this reference an incandescent bulb is fitted below a reflector to project a beam of light towards the depths of a body of water upon which the illumination device floats. The above-source focusing reflector minimizes the spreading of light upwardly and the device does not include features to enhance the spreading of light out in a horizontal plane. This device is, effectively, a spotlight as opposed to floodlight.

Several other U.S. Patents describe battery-powered devices for providing underwater light in swimming pools. An underwater light is described in U.S. Pat. No. 5,934,796 including an upper structure having a downward-directed hemispherical surface covered with a number of mirror segments. A base unit, mounted on a segmented shaft extending downward from the center of the upper structure, includes a number of battery-powered lights directed upward toward the hemispherical surface. Preferably, the upper structure is driven by a motor to rotate about the shaft relative to the base unit, so that a moving pattern of lights is created on the pool walls and bottom. The apparatus may float with the upper structure on the surface of the water, or the base unit may be placed on the bottom of the pool.

U.S. Pat. No. 4,779,174 describes a flat, disk-shaped battery-powered light, which can be submerged, and left on the bottom of a swimming area for use as a point of orientation for people swimming underwater at night.

U.S. Pat. No. 4,088,880 describes a decorative fountain especially adapted for use in a swimming pool, the fountain being adapted to float at the surface of the pool and incorporating a sealed beam light bulb for illumination of the fountain display, and further embodying a self-contained source of electrical current for the light bulb.

U.S. Pat. No. 5,351,432 describes a battery-powered, illuminated fishing float having a housing shaped as a gourd, with a tapered lower compartment including a battery, a tapered upper compartment including an LED (light-emitting-diode), which is on whenever the battery is operational, and an enlarged central section including a light bulb which is turned on by upward movement of a floating actuator. The float is fastened to a fishing line, so that the light bulb is turned on when the line is pulled downward by a fish.

A number of further examples from the patent art, including U.S. Pat. Nos. 4,999,755 and 4,665,470, describe tubular structures including plural light packages.

A need exists for a floating illumination device which is self powered and which will provide illumination that extends upwardly from the illumination source, thereby more effectively providing lateral illumination, maximizing the volume within a body of water that receives light and providing improved lighting along wall surfaces of the pool near the surface of the water. This invention addresses that objective as well as other features.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which concludes this Specification.

SUMMARY OF THE INVENTION

According to the invention in one aspect, a self-powered illumination source is provided in a buoyant body having a light emitting lower source for projecting light into a body of water when the illumination device is floated on the surface of such body of water. By extending the source of illumination by a distance below the body (which provides at least a portion of the flotation for the device), a substantial portion of the light is emitted laterally. Thus, preferably, light is emitted in directions which are more equally distributed between the horizontal and vertical directions, and preferably which is predominantly more outwardly directed in the lateral direction than in the downward direction. A portion of the light is directed at an upward angle which takes advantage of reflection off of the undersigned surface of the air-water interface. This preferred distribution of light is enhanced by use of a faceted globe surrounding the source and, optionally, by the presence of frosted areas on the lower end of the globe. The facets in the globe serve to redirect a portion of the light emitted downwardly towards an upward angle.

The invention permits illumination from the light source to more preferably strike the sides of the pool. Further, light striking the under side surface of the water-air interface will also be reflected outwardly and laterally from the light source to strike the sides of the pool. Preferably the light emitting portion of the illumination source is positioned below an opaque underside surface portion of the buoyant body, extending downwardly by a distance which permits at least 20% of the emitted light to strike the underside surface of the water-air interface and thereby to be reflected outwardly and laterally from the light source after striking such underside surface.

When used in a swimming pool, this configuration increases the amount of illumination provided along a greater portion of the wall surfaces of the pool near the surface of the water, providing a more complete illumination of the inner volume of the pool.

A preferred light source is a fluorescent tube which has a length that extends downwardly that is commensurate or greater than its width. Good effects are achieved by use of a spiral fluorescent tube with a light-emitting portion that extends 3 to 5 cm into a surrounding globe described further below. Thus the light source may have an aspect ratio, in terms of its length to width proportions, of 1.1:1, or greater.

A reflector may be placed above the illumination source, directing even more light in an outwardly direction. This reflector may, preferably, be in the form of a flat plate or may be slightly conical in form. Conveniently, a mirrorized Mylar (TM) film may be bonded to a ballasting plate of steel or equivalent mounted above the illumination source.

The illumination source may be positioned within a partially surrounding transparent and/or translucent dome. This dome may have refracting facets that redirect light more laterally. Portions of the dome surface, preferably the lowermost portion, may be frosted or otherwise rendered translucent in order to defuse downwardly-directed light. This reduces the tendency for a “spot” of light to form on the pool bottom.

The base of the dome may be shaped to receive and retain filters or lenses which cover the dome and modify the light being emitted. This may be provided by inclusion of a graspable “coupling ring” exposed at the juncture of the dome and its base in the floating body. Light modification affects may include the addition of colored filters. The coupling ring may also be employed to add accessory components, such as additional flotation, or an external, supplemental reflector.

The buoyant body is most preferably shaped to be self-stabilizing. That is, if it is inverted, it will spontaneously right itself to place the source of illumination downwardly in the body of the water, at a point located centrally below the buoyant body. The shape of the buoyant body preferably insures that this self-righting effect is continually present irrespective of the orientation of the unit. As described further below, the placement of batteries as well as the shape of the buoyant portions may contribute to achieving this stability.

It is desirable, as well, that the device not be excessively buoyant. It should have an overall specific gravity that is close to that of water, e.g. in the approximate range 1.05 to 1.3, providing it with a tendency to gradually float upwardly, rather than to rise so rapidly as to be ejected upwardly, above the pool surface, on surfacing. This degree of buoyancy will resist a tendency to be used as a swimming toy and reduce its exposure to violent motions. Additionally, a barely buoyant device may, by the addition of a weight, be allowed to sink to the bottom the pool, providing illumination from the bottom of the pool if so desired. Retrieval may be effected by a cord which serves as a tether, the cord terminating at its free end in a small float for ready retrieval.

The buoyant body may be integrally formed, or may be of a composite character. A central illuminating portion may be constructed, preferably so as to be buoyant, but just barely buoyant, and then a surrounding flotation collar may be fitted to the central portion to provide the desired degree of additional stabilizing flotation. This collar or outer periphery of the body generally, may be made of a soft, resilient material that will cushion collisions between users of the pool and the illumination device.

The buoyant body may be provided with a translucent outer edge that extends into the illumination zone provided by the source of illumination. Light-piping means may be employed to convey light to illuminate such portions of the body. By positioning this edge to intercept light, it will become visibly discernible against a darker background, thereby allowing the position of the illumination device to be more readily identified in the dark. At the same time, the upper surface may be patterned or colored to make it readably visible in daylight, thereby reducing the prospects that a pool user will inadvertently dive or jump onto the illumination device.

The illumination source is preferably provided with electrical power from an on-board electrical source such as batteries, fuel cells or other equivalent means that allow the unit to operate independently. While the illumination source may be an incandescent lamp or a light emitting diode-LED, a preferred illumination source is a fluorescent lighting tube excited by power provided from the electrical source that has had its voltage boosted to the appropriate level by on-board electronic circuitry to activate the tube. This type of fluorescent lighting arrangement is very efficient in terms of power consumed for light emitted, and leads to adequate lifetimes for batteries.

To supply voltage for the light source, multiple individual electrical cells may be mounted in a circumferentially-distributed pattern within the body of the device at a level that will contribute to establishing a low center of gravity within the device. This will, preferably be supplemented by further ballasting, e.g. a steel plate as described elsewhere, to provide stability for flotation.

The illumination source may provide multiple levels of brightness. The illumination level(s) may be discreet or may be continuously variable. An electrical timing circuit can, after a predetermined period of time, automatically reduce the illumination to a lower level in order to conserve battery lifetime, unless overridden by a user command.

Activation of the illumination source may be provided by a simple user “on” switch, coupled to a circuit which is timed to go “off” after a predetermined delay, unless overridden by a user command. As an alternative “on” switch, an inertial motion detector can detect the physical displacement of the buoyant body, such as may arise when the pool commences to be used by swimmers. In this configuration, the illumination device will automatically turn “on” when it senses the agitation of waves spreading across the surface of the water. In a further embodiment, the device may incorporate an optical motion sensor which activates the illumination upon sensing the presence of a user arriving at the poolside, before they enter the water.

To preserve the water-tight integrity of the device, the “on” switch may be a magnetically coupled switch which relies upon an external magnet sliding on the outer surface to activate a switch located on the inner surface of the shell of the device.

Illumination devices according to the invention may either be passive or active. An active device may incorporate propulsion means together with remote-control means by which a user may direct the device to travel across the surface of the water upon which it has been placed. Such a feature would be useful for docking a boat at night along an unknown shoreline. It can also provide the basis for an entertaining experience for persons located poolside.

The illumination device according to the invention may also be converted from a floating environment to a more normal, above water, source of illumination. It can be shaped so that, when inverted to present its illumination source upwardly, the device can be placed stably on a surface such as a table. To reduce glare, a diffuser can be provided that extends around the illumination source when it is placed in such configuration. Or a large reflector can be fitted around the light source, enabling it to be used as a search beam. The coupling ring can be constructed to carry these components. Because the light source protrudes outwardly from the flotation body portion of the device, room is available to fix such a reflector behind the light source.

Other features of the invention can include:

- A connector or coupling for hanging the device for use as a flood light to illuminate property, camp-sites, picnic areas, docks and waterfront areas such as at a cottage.
- A support for resting the device on a stand thus allowing for its use as a table lamp to illuminate the area around, wherever it might be.
- An electrical connections system for recharging each device through magnetic induction thus eliminating any need for unnecessary penetrations in the integrity of the waterproof body of the unit.
- Solar charging may be provided by mounting solar cells on the device.
- A charge control system may be included for managing the recharging of the unit such that the unit cannot be recharged while still providing illumination to the body of water. This is a useful safety feature to avoid location of the charger near the pool.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
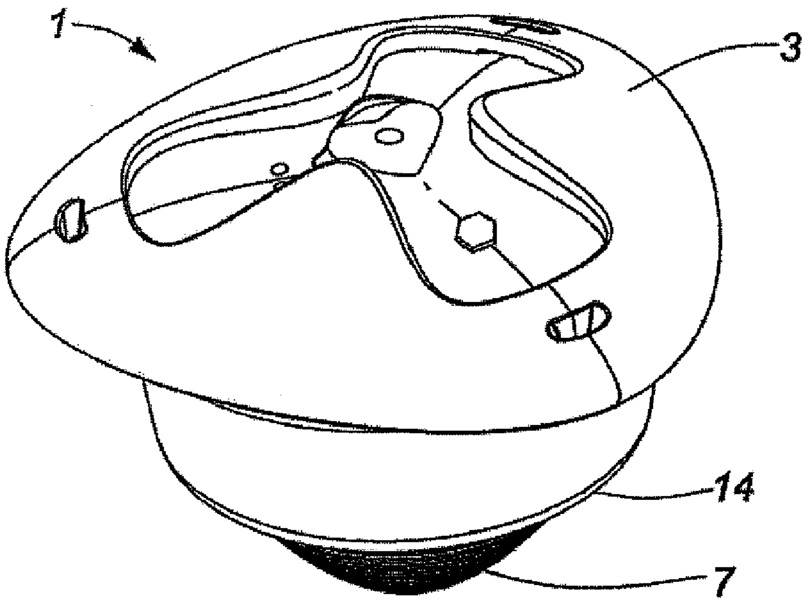
FIG. 1 is a downwardly directed perspective view of the illumination device.
Figure 2:
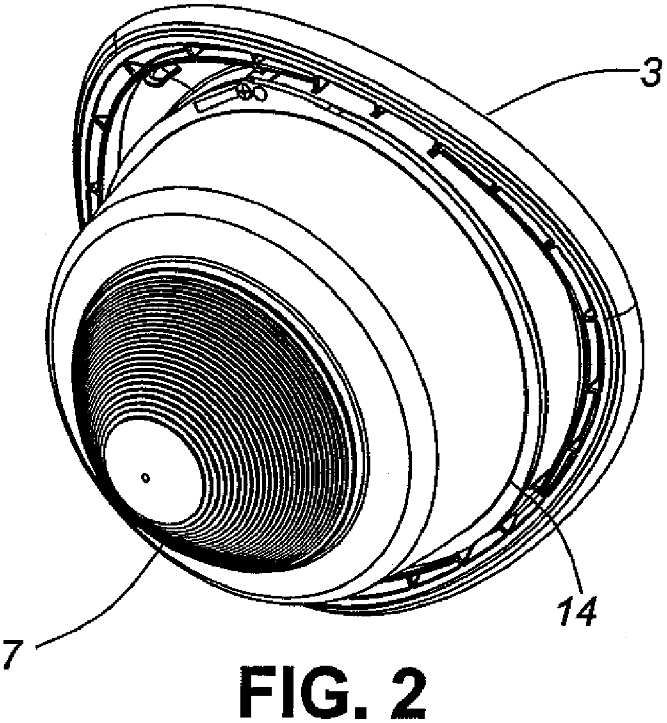
FIG. 2 is an upwardly directed perspective view of the illumination device of FIG. 1.
Figure 3:
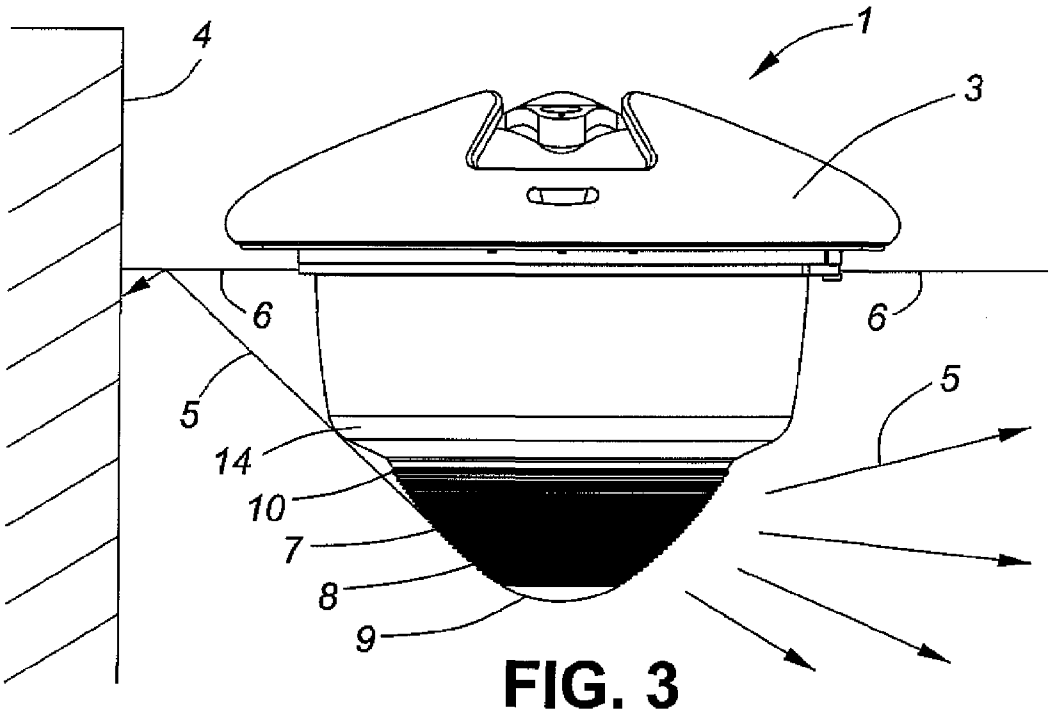
FIG. 3 is a side view of the illumination device of FIG. 1 and is depicted a floating on the surface of water within the confines of the walls of a swimming pool.

As depicted in FIGS. 1 to 6, an illumination device 1 is provided with a fluorescent tube 2 mounted in a buoyant body 3 and positioned for projecting light into a body of water when the illumination device 1 is floated on the surface of such body of water. The source of illumination, the fluorescent tube 2, extends a distance below the body. As shown in FIG. 3, light is emitted in directions which are distributed between the horizontal and vertical directions, but preferably light is directed outwardly in the horizontal direction, permitting illumination from the light source to more preferably strike the sides 4 of the pool.

More light is directed laterally than downward. The boundary between lateral and downward directions may be taken as a 45 degree downward inclination from the horizontal.

A portion of the emitted light 5, preferably more than 20%, is directed at an upward angle which takes advantage of reflection off of the underside surface 6 of the air-water interface. This portion of the light 5 is then reflected outwardly and laterally from the light source 2 to strike the sides 4 of the pool. This preferred distribution of light is achieved or enhanced by use of a dome 7 having a faceted surfaces 8 surrounding the light source 2 and by the presence of frosted areas 9 on the lower end of the dome 7. The faceted surfaces 8 surrounding the light source 2 are angled to redirect a portion of light emmitted downwardly towards a more upwardly direction.

Figure 4:
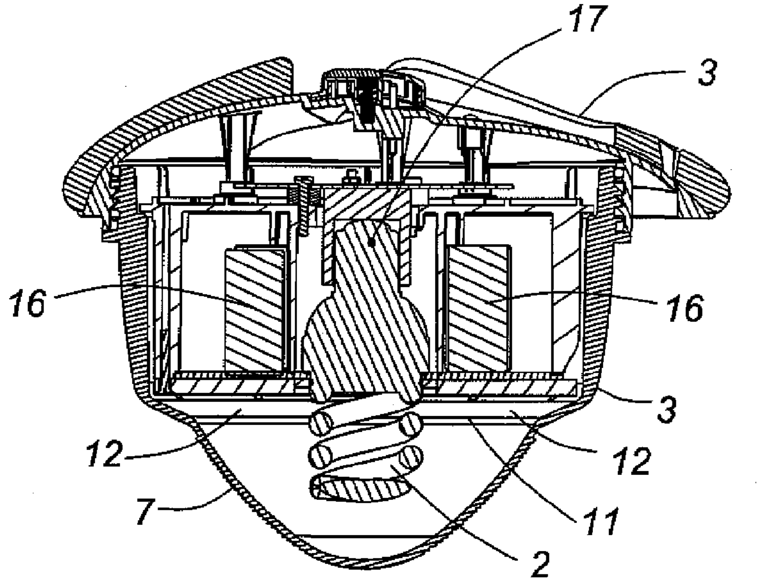
FIG. 4 is a cross-sectional view of the illumination device of FIG. 3, partially rotated from its orientation in FIG. 3.
Figure 5:
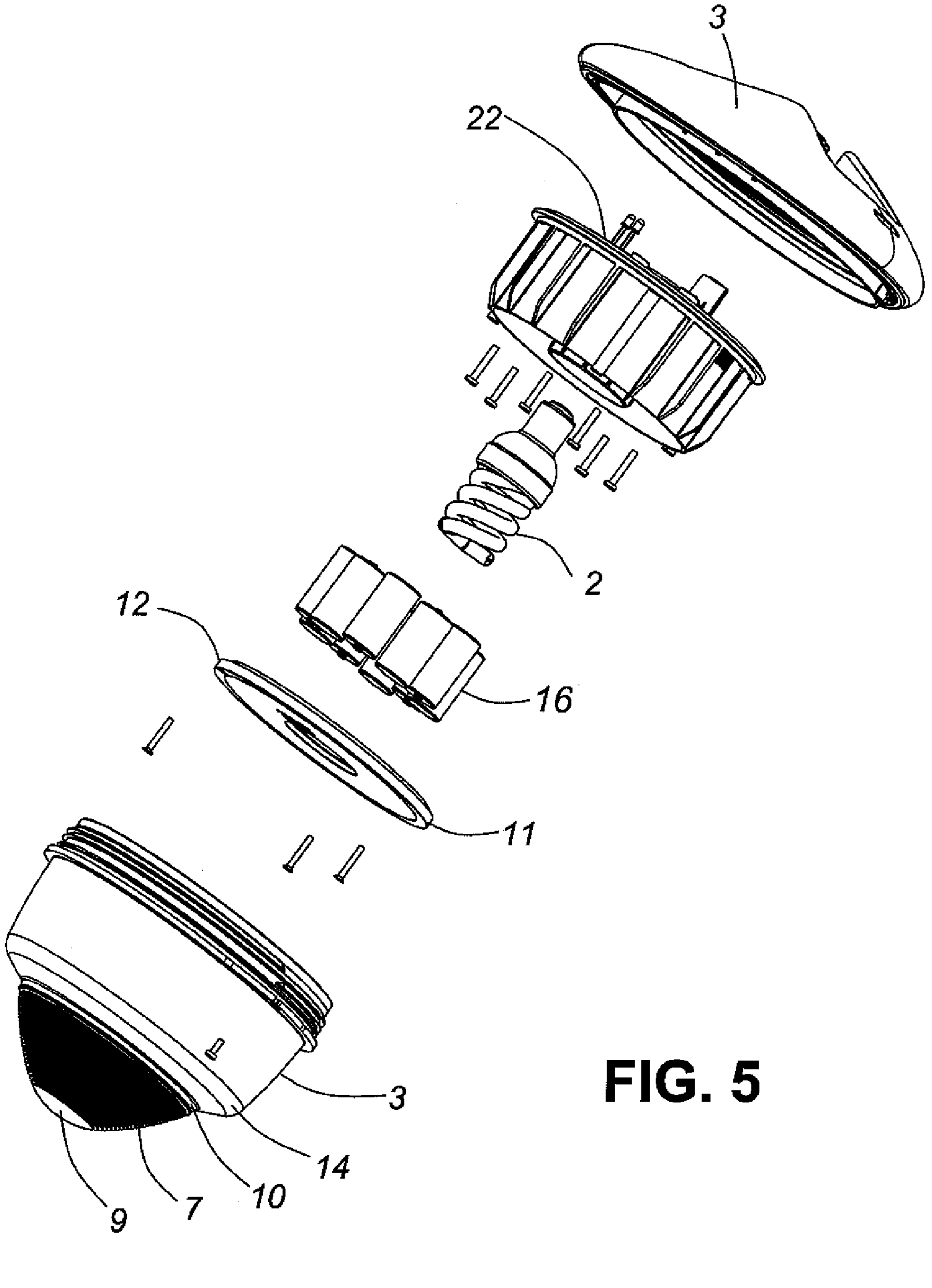
FIG. 5 is an exploded perspective view of the illumination device showing its principal components.
Figure 6:
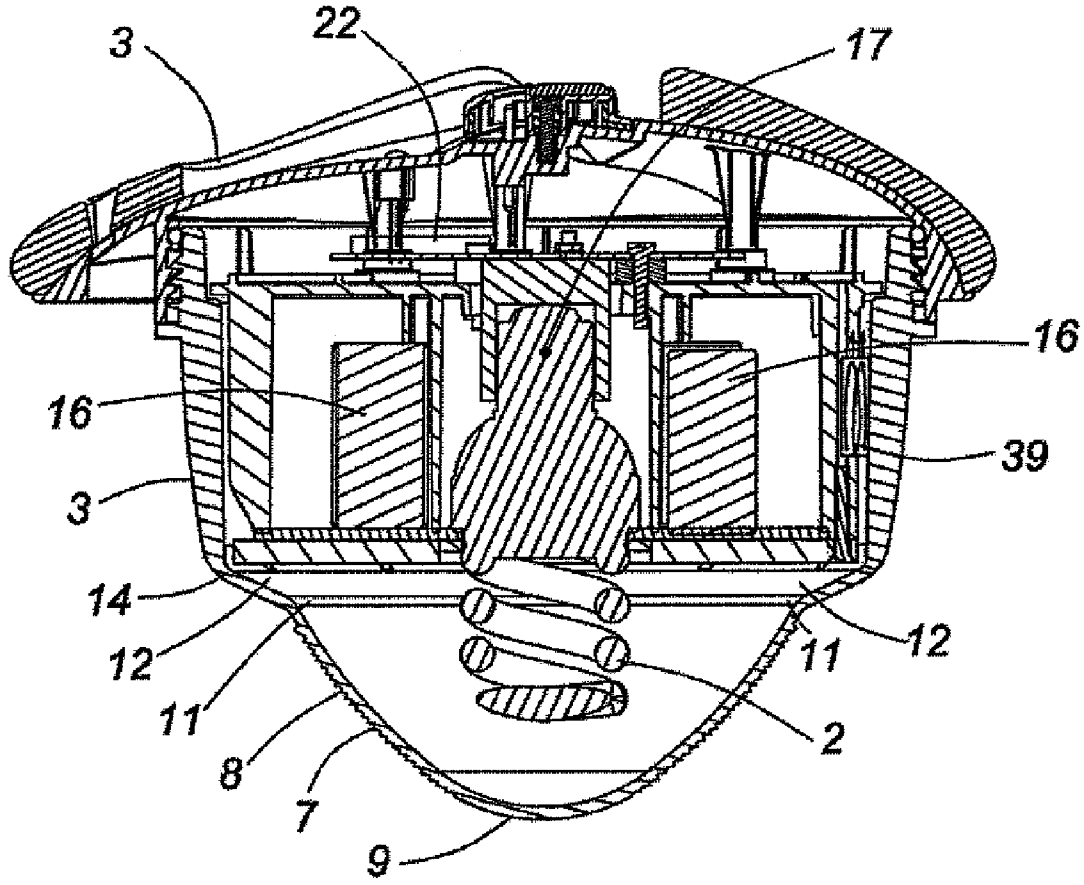
FIG. 6 is a further rotated partial cross-sectional view of the illumination device of FIG. 4 showing a side view of the faceted surface of the underside dome of the device.

As a preferred light source, the fluorescent tube 2 preferably has a light emitting portion with an aspect ratio, in terms of its length to width proportions, of 1.1:1, or greater. Depicted in FIGS. 4 and 5 is a spiral fluorescent tube 2 which may have an aspect ratio of 1.5:1 and whose illuminated portion extends about 4–5 cm into the surrounding dome 7 that isolates the tube from the water.

While the refracting facets 8 redirect light more laterally, the lowermost portion of the dome surface is frosted 9 to render it translucent in order to defuse downwardly-directed light and reduce the tendency for a “spot” of light to form on the pool bottom.

Figure 8:
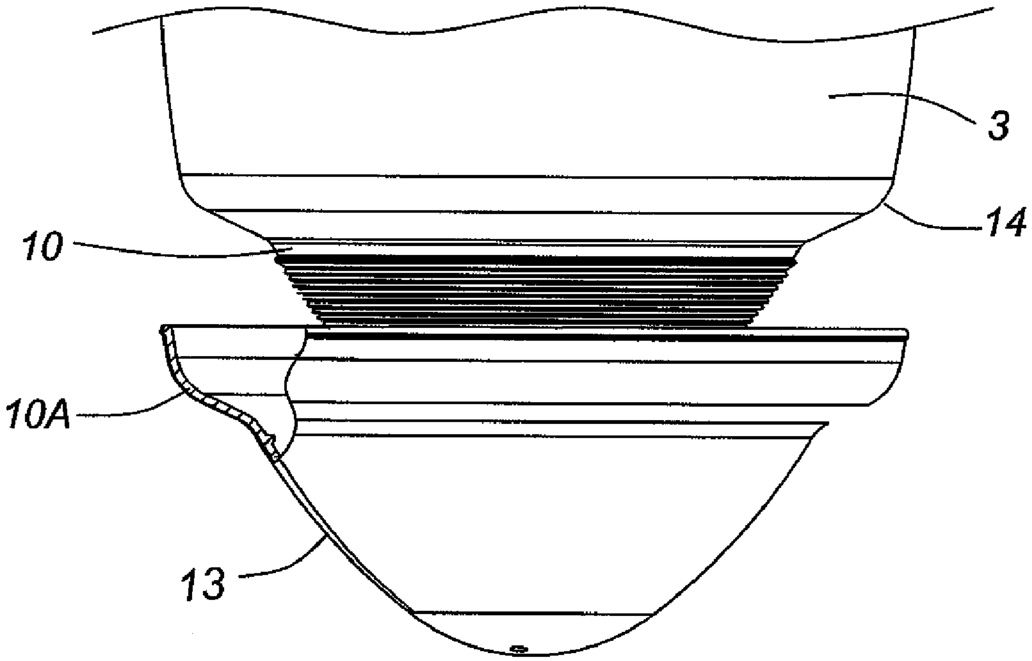
FIG. 8 shows the fitting of an external colored filter to a coupling ring on the dome surrounding the light source.

The base of the dome 7 is shaped to receive and retain accessories such as filters 13, lenses, diffuser 32, or reflectors 33 which can be fitted to the dome 7 to modify the light being emitted. This shape provides a graspable “coupling ring” 10 at the juncture of the dome 7 with the buoyant body 3. FIG. 8 shows the fitting of an external colored filter 13 having a complementary engagement surface 10A to the coupling ring 10.

Figure 9:
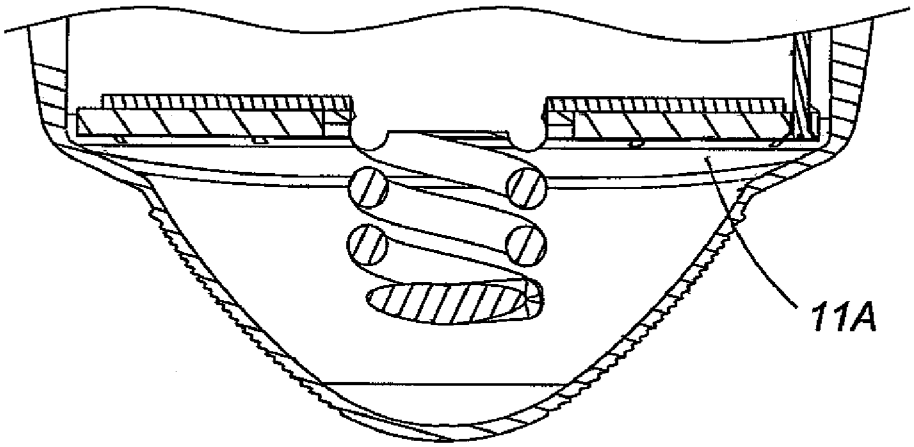
FIG. 9 is a cross-sectional side view of a ballasting steel plate carrying a reflecting Mylar film, the plate being slightly conical to reflect light divergently.

At the base of the light source 2, on the underside of the floating portion of the body 3, a reflector in the form of a mirrorized Mylar (TM) film 11 is bonded to a ballasting plate 12 of steel mounted to the body 3 of the device. By being flat, such reflector 11 has a reduced tendency to direct light in the fully downward direction. Optionally, as shown in FIG. 9, the lower surface of the plate 11A may be slightly raised proceeding away from its center as shown, in a slight, outwardly-reflecting, conical or slightly spherical shape, to direct light divergently in an even more lateral direction.

The overall volume and weight of the device 1 is adjusted so that it has have an overall specific gravity that is close to that of water, e.g. in the approximate range 1.05 to 1.3. This provides the device 1 with a tendency to gradually float upwardly, rather than to rise rapidly when submerged within the pool. Additionally, the coupling ring 10 may be employed to attach as an alternate accessory a weight which will cause the unit to sink to the bottom the pool, providing illumination from the bottom of the pool if so desired.

The buoyant portion of the body 3 is provided with a translucent outer edge 14 that extends into the illumination zone provided by the source of illumination 2, as depicted in FIG. 3. Light-piping means can also be employed to convey light to illuminate such portions 14 of the body 3. By positioning this edge 14 to intercept light, it become visible allowing the position of the illumination device 1 to be more readily identified in the dark. The upper surface of the body 3 is also patterned to make it readably visible in daylight, thereby reducing the prospects that a pool user will inadvertently dive or jump onto the illumination device.

The shape and weight distribution within the buoyant body 3 is intended to assure that it is self-stabilizing. That is, if it is inverted, it will spontaneously right itself. This is achieved by placing the center of mass below the center of flotation when the device is in an upright orientation. Further, it is preferable that the dimensions of buoyant portions of the unit be limited to ensure that the device is fully self-righting irrespective of its orientation with respect to the surface of the water.

Electrical power for the illumination source 2 is provided by batteries in the form of multiple individual electrical cells 16 mounted in a balanced, circumferentially-distributed pattern within the body 3 of the device 1. This circle of batteries 16 is positioned at a level within the device 1, below the center of volume, that will contribute to providing a self-righting characteristic. That is, the cells 16 in FIG. 4. are located below the center of volume 17 of the device 1. This ballasting effect is further supplemented by the presence of the steel plate 12 that carries the Mylar-reflecting film 11.

The fluorescent lighting tube 2 is excited by power provided from the batteries 16 with such voltage being boosted to the appropriate level by a self-ballasting electronic circuitry carried within the fluorescent light assembly. It has been found sufficient to provide a total battery voltage of 12 volts, using eight nickel cadmium rechargeable cells 16 or equivalent supplying current to a commercially available fluorescent light 2 manufactured to operate off of 12 volts.

Figure 10:
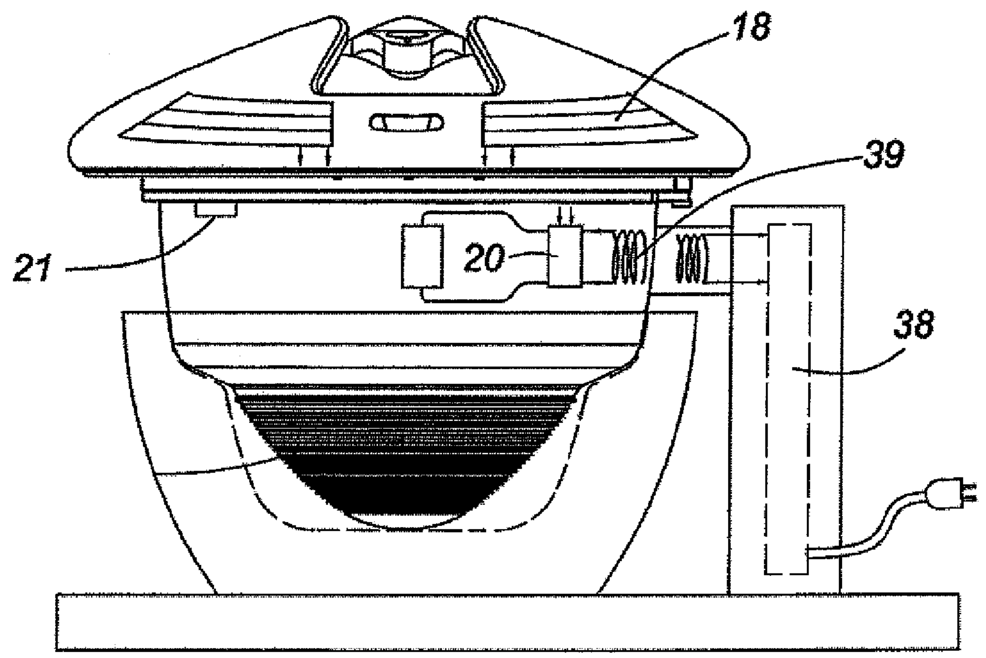
FIG. 10 is side view of the illuminating device coupled to an electrical source in order to recharge its internal batteries.

As shown in FIG. 10, recharging of the batteries 16 from the low voltage source, such as 24 volts step-down transformer 38, is effected through a magnetic induction coupling. 39. Recharging may be supplemented by solar cells 18 mounted on the upper surface of the device 1. Recharging in both cases is managed through a charging control circuit 20.

Figure 7:
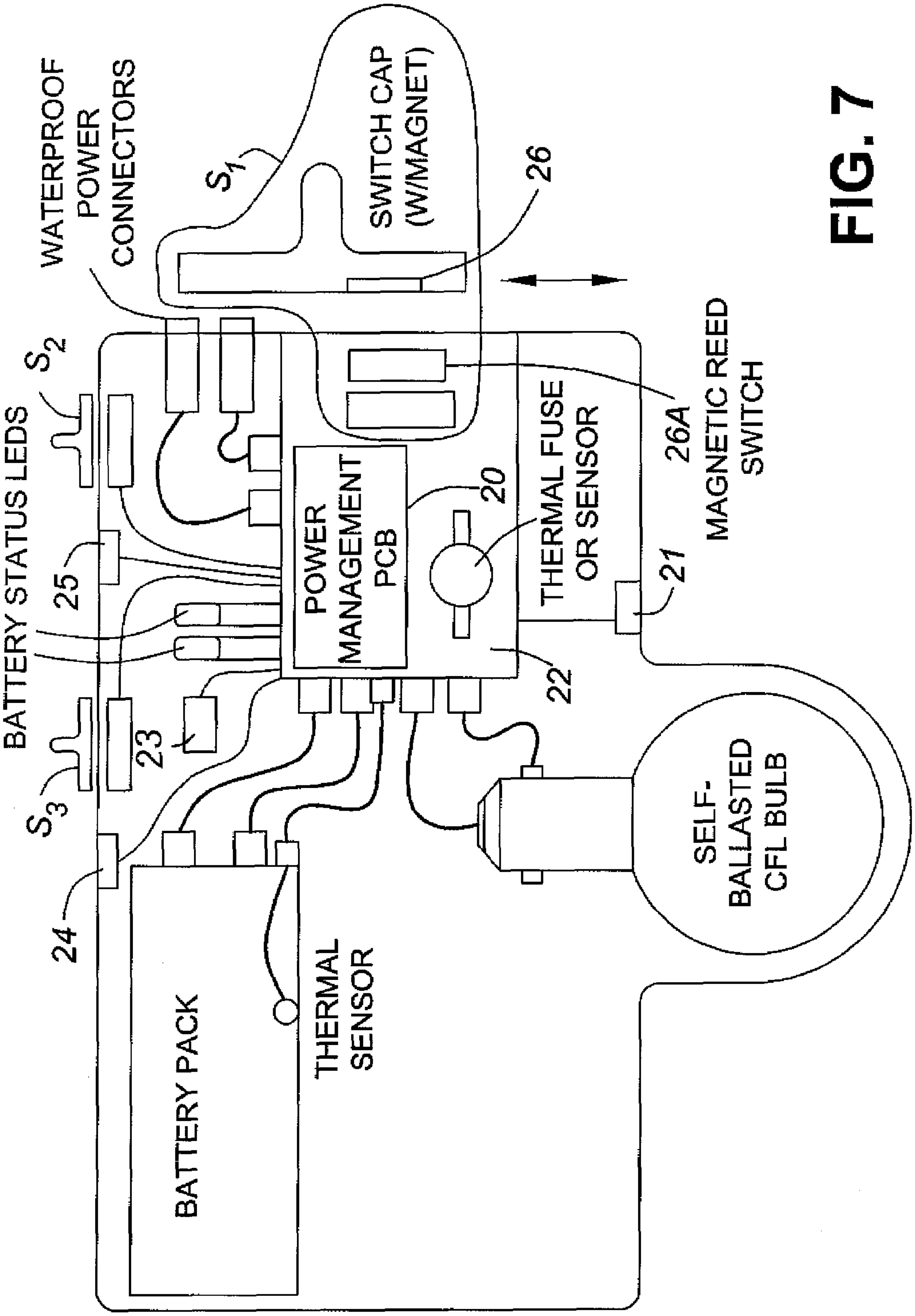
FIG. 7 is a partial schematic showing the wiring and electronic components of the illumination device of the invention.

The charging control circuit 20 also includes an overriding water sensor switch 21 shown in FIG. 7. This water sensor switch 21 operates on the basis of sensing the presence of a low level current when the sensor 21 is immersed in water. This switch 21 ensures that the unit cannot be recharged at least from the electrical grid while it is floating on the water.

Activation of the illumination source 2 is effected through a lighting control circuit 22 that is connected to a basic off/on switch S1. These features are shown schematically in FIG. 7. The lighting control circuit 22 includes an electrical timing circuit which, after a predetermined period of time, will shut the light "off", unless overridden by a user command provided through switch S2. This same circuit 22 automatically reduces the illumination to a lower level in a shorter period of time in order to conserve battery lifetime, unless overridden by a user command provided by switch S3.

The unit also incorporates a parallel internal "on" switch 23 in the form of an inertial motion detector. This detector 23 senses the physical displacement of the buoyant body 3, such as may arise when the pool commences to be used by swimmers. In this configuration, the illumination device 1 will automatically turn "on" when it senses the agitation of waves spreading across the surface of the water. A further optical motion sensor 24 also activates the illumination upon sensing the presence of a user arriving at the poolside, before they enter the water. These automatic "on" functions may, however, be overridden by a light sensing diode 25 and associated circuitry included in the lighting control circuit 22 which only permits the unit to be turned "on" when the ambient level of light is below a predetermined threshold. Thus these latter functions need not operate during daylight.

To preserve the water-tight integrity of the device, these switches S1, S2, S3, are of the magnetically coupled type which rely upon an external magnet 26 sliding on the outer surface of the device 1 to activate a complementary switch portion 26A located on the inner surface of the shell of the device 1.

Figure 11:
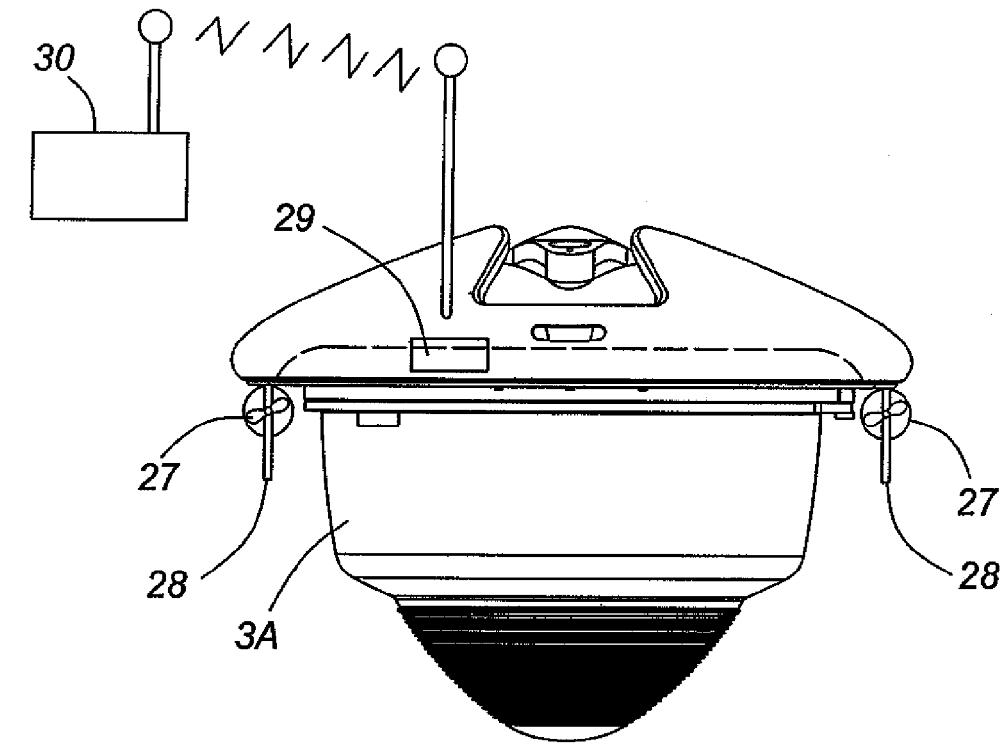
FIG. 11 is a pictorial depiction of a floating illumination body which incorporates propulsion and guidance means in the form an electrically driven propeller and an electrically controlled rudder 28 that may be remotely controlled.

In FIG. 11 a floating illumination body 3A incorporates propulsion and guidance means in the form an electrically driven propeller 27 and an electrically controlled rudder 28 coupled to remote-control receiver circuitry 29 by which a user with a control transmitter 30 may direct the device 1 to travel across the surface of the water upon which it has been placed.

Figure 12:
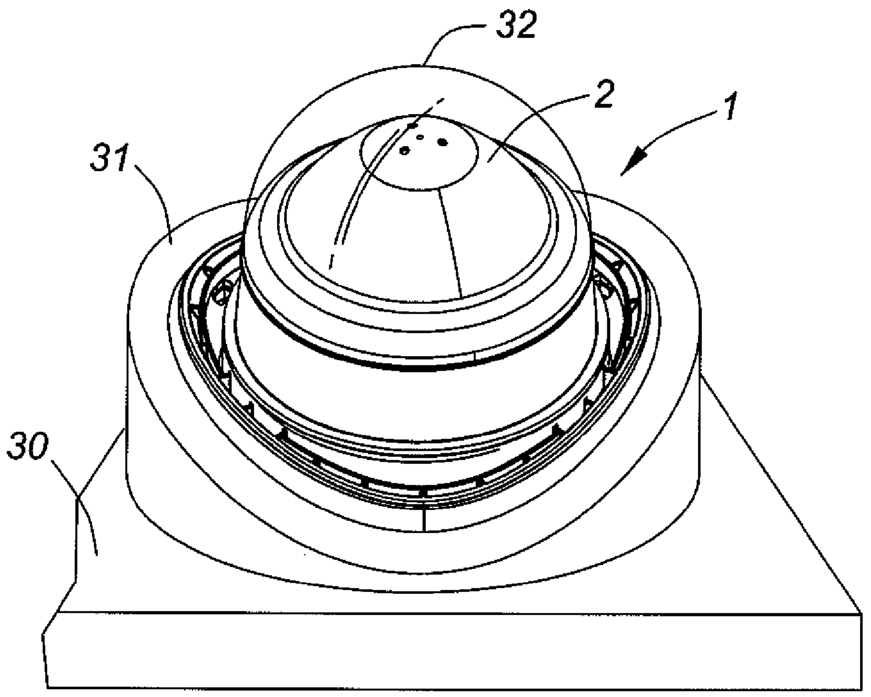
FIG. 12 is a pictorial depiction of the illumination device inverted and placed on a supplementary support for positioning on a table surface.

In FIG. 12 the illumination device 1 is shown inverted to present its illumination source 2 upwardly, while the device is placed on a table surface 30. A supplementary support 31 ensures that the unit rests stably on the surface 30. To reduce glare, a diffuser 32 is provided that extends around the illumination source 2 and is fastened to the coupling ring 10.

Figure 13:
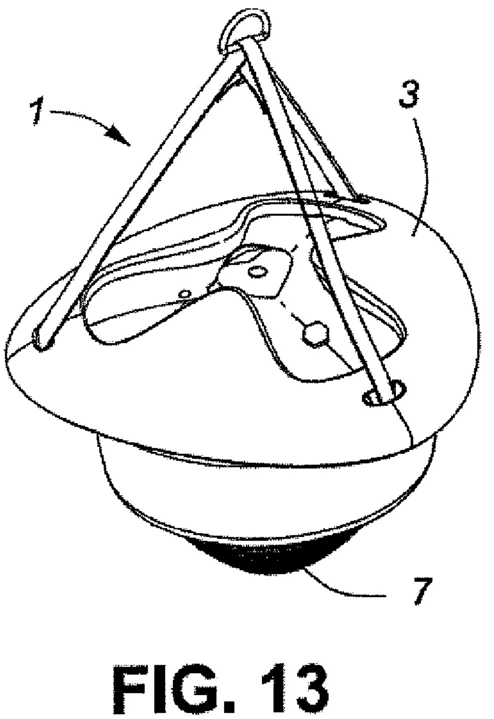
FIG. 13 is a pictorial depiction of the illumination device provided with a connector allow allowing the device to be hung as a flood light to illuminate an area beneath the suspended light source.

In FIG. 13 a connector is provided to allow the device 1 to be hung as a flood light to illuminate an area beneath the suspended light source 2.

Figure 14:
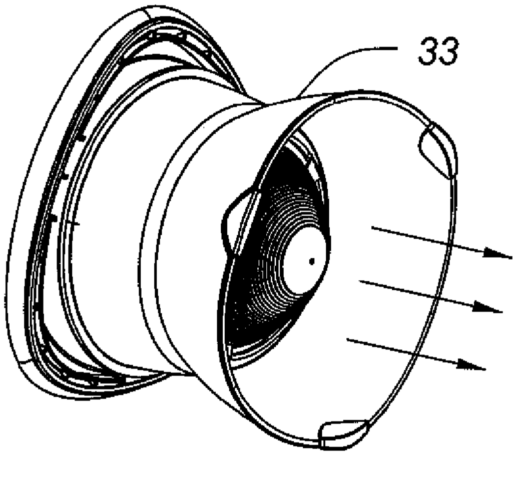
FIG. 14 a pictorial depiction of an external reflector fitted around the dome enclosing the light source, enabling the unit to function as a search beam.

In FIG. 14 a large reflector 33 is fitted around the light source 2, connected to the coupling ring 10. This enables the unit to function as a search beam.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A self powered illumination device for floating on a surface of a body of water having a water-air interface, said device including a power source and an illumination source contained within a buoyant body, the buoyant body having:

a) an undersurface portion and a protruding, light transmitting, lower surface for projecting light into a body of water when the illumination device is floated in an upright orientation on the surface of such body of water b) a dome having faceted surfaces surrounding the light source, the faceted surfaces surrounding the light source being angled to redirect a portion of light emitted downwardly towards a more upwardly direction wherein:

the source of illumination is of a dimension and is positioned at a distance below the undersurface portion to provide that a greater portion of light emitted therefrom is directed for emission in the lateral direction rather than the downward direction and a portion of the downwardly emitted light is directed at an upward angle for reflection off of the water-air interface and then outwardly and laterally from the fight source.

2. An illumination device as in claim 1 wherein the illumination source is a fluorescent tube.

3. An illumination device as in claim 1 wherein the light emitting portion of the illumination source has a length that extends downwardly that is at least 1.5 times greater than its width.

4. An illumination device as in claim 1 wherein said illumination source is positioned below an opaque underside surface portion, extending downwardly by a distance which permits at least 20% of the emitted light to strike the underside surface of the water-air interface to be reflected outwardly and laterally from the light source after striking such underside surface.

5. An illumination device as in claim 1 wherein the lowermost portion of the dome surface is frosted to render it translucent so as to defuse downwardly-directed light and reduce the tendency for a "spot" of light to form beneath the illumination device.

6. An illumination device as in claim 1 comprising the transparent or translucent dome fitted to surround said illumination source wherein said dome incorporates a coupling ring at its base shaped to receive and engage with a light modifier.

7. An illumination device as in claim 5 in combination with an accessory selected from the group consisting of a diffuser, a color filter, a lens, a sinking weight and a reflector, said light modifier being shaped to fit over said dome and engage said coupling ring.

8. An illumination device as in claim 1 comprising a reflector placed above the illumination source for directing light in an outwardly direction, said reflector being in the form of a flat, or slightly outwardly-reflecting, surface.

9. An illumination device as in claim 8 wherein the reflector is in the form of a flat reflecting surface.

10. An illumination device as in claim 1 wherein, combined with the center of mass of the device, the buoyant body is shaped to provide that the device is self-righting.

11. An illumination device as in claim 10 comprising multiple, individual electrical battery cells wherein the buoyant body is provided with a tendency to be self-righting by the placement of the cells in a circumferentially-distributed pattern within the body of the device, at a level below the center of volume of the device.

12. An illumination device as in claim 1 having an overall specific gravity that is in the range 1.05 to 1.3, providing it with a tendency to gradually float upwardly upon being immersed in water.

13. An illumination device as in claim 1 comprising illumination source control means to provide multiple levels of brightness.

14. An illumination device as in claim 1 comprising an electrical timing circuit which, after a predetermined period of time, automatically reduces the illumination to a lower level in order to conserve battery lifetime.

15. An illumination device as in claim 1 comprising an electrical circuit which is timed to switch the illumination source "off" after a predetermined delay.

16. An illumination device as in claim 1 comprising an inertial motion detector to detect the physical displacement of the buoyant body and to automatically turn the illumination source "on" when it senses agitation of the device arising from waves spreading across the surface of the water.

17. An illumination device as in claim 16 containing an optical sensor for sensing ambient light which optical sensor is connected to an override circuit for preventing the illumination source from being turned "on" when the inertial motion detector senses agitation of the device.

18. An illumination device as in claim 1 comprising a magnetically coupled "on" switch which comprises an external magnet sliding on the outer surface of the body of the device to activate a magnetically-sensitive switch located on the inner surface of the body of the device.

* * * * *